US005846016A

United States Patent [19]

Martinez et al.

[11] Patent Number: 5,846,016

[45] Date of Patent: Dec. 8, 1998

[54] DEVICE AND METHOD FOR SUPPORTING DOORS WHICH ARE TO BE PAINTED

[76] Inventors: Julian E. Martinez, 3049 N. 1025 East, North Ogden, Utah 84414; David C. Garcia, 2340 S. Main, Clearfield, Utah 84015

[21] Appl. No.: 823,217

[22] Filed: Mar. 24, 1997

[51] Int. Cl.$^{6}$ ........ F16B 9/00

[52] U.S. Cl. ........ 403/388; 403/384; 403/168

[58] Field of Search ........ 403/167, 168, 403/192, 203, 220, 229, 300, 384, 385, 405.1, 406.1, 122, 119; 211/105.1; 248/351, 200.1; 160/330

[56] References Cited

U.S. PATENT DOCUMENTS

| | | | |
|---|---|---|---|
| 317,132 | 5/1885 | Headington et al. | 403/122 X |
| 1,630,036 | 5/1927 | Smith | 403/167 |
| 2,011,662 | 9/1935 | Thompson | 160/330 |
| 2,219,075 | 10/1940 | Le Veau | 160/330 |
| 2,430,027 | 11/1947 | Morrison | 248/351 |
| 3,765,666 | 10/1973 | Chretiennot | 269/37 |
| 3,833,201 | 9/1974 | Dill | 256/35 |
| 4,737,048 | 4/1988 | Herrstrom | 403/229 |
| 5,295,592 | 3/1994 | Gobidas et al. | 211/105.1 |
| 5,690,237 | 11/1997 | Marzec | 211/105.1 |

FOREIGN PATENT DOCUMENTS

| | | | |
|---|---|---|---|
| 1475215 | 2/1967 | France | 403/119 |

*Primary Examiner*—Anthony Knight
*Assistant Examiner*—John R. Cottingham
*Attorney, Agent, or Firm*—Terry M. Crellin

[57] ABSTRACT

A device for interconnecting two doors to hold the doors spaced apart in a standing, upright position so that the doors will stand in a stable condition with all sides of the doors being accessible for painting comprises an elongate connecting member having attachment members connected to the opposite ends of the elongate connecting member. Outwardly facing planar faces of the attachment members have a size such that they can be received flatwise within and attached to hinge attachment locations on the side edges of respective doors. The outwardly facing planar faces of the attachment members are oriented so that planes through the outwardly facing planar faces intersect each other at an included angle of at least about 15 degrees and up to 180 degrees.

5 Claims, 4 Drawing Sheets

DEVICE AND METHOD FOR SUPPORTING DOORS WHICH ARE TO BE PAINTED

BACKGROUND OF THE INVENTION

1. Field of the Invention

The present invention relates to a system and method of supporting two doors in an upright position so that both doors can be painted on all sides of each door. In particular, the present invention relates to a device for interconnecting two doors so that the doors support themselves in an upright position from the floor. The device for interconnecting the doors has attachment means at its opposite ends that are attached to respective doors at the hinge attachment locations on the side edges of the doors.

2. State of the Art

Various methods have been used to refinish, i.e., paint, doors, such cabinet doors or passageway doors. For example, the doors are left in place which means that the painter has to be very careful to avoid the hinges and other cabinet parts. Also, in this case, it is difficult to reach all the edges of the door. In another method, the doors are removed for convenience in painting but this means that the door must be leaned up against something or laid flat with the result that one side must be allowed to dry before painting the other side. This applies as well to new doors to be mounted.

Devices have heretofore been provided in an effort to speed up painting or treating of doors. For example, U.S. Pat. Nos. 5,164,011 and 5,090,648 are concerned with an upright standard with right angle top and bottom arms that support a door vertically by upper and lower pins that penetrate the top and bottom edges of the door whereby the door can be rotated to paint or treat both sides without waiting for one side to dry. U.S. Pat. No. 1,581,960 shows a somewhat similar structure wherein portions of the support structure penetrate the door. In all of these patents, damage results to the doors which requires repair of the holes.

Given the problems associated with a conventional approach to painting interior doors, and the shortcomings of presently available devices designed to overcome the problems of the conventional approach, there is a need for a device that can stabilize a pair of doors standing upright from the floor, with the doors essentially supporting each other in spaced apart positions which enables access to all sides of each of the doors.

OBJECTIVES AND BRIEF DESCRIPTION OF THE INVENTION

A principal objective of the invention is to provide a novel device that interconnects two doors, with the device extending between side edges of the doors and having opposite ends thereof attached to hinge attachment locations of the respective doors.

A further objective of the present invention is to provide such a device that can be used to interconnect two doors of different heights, with the two doors supporting each other by way of the device in an upright position from the floor.

The above objectives are achieved in accordance with the present invention by providing an elongate connecting member having attachment plates positioned at the opposite ends of the connecting member. The attachment plates are of a size that they can be received flatwise on the hinge attachment locations on two respective doors that are standing upright from the floor. At least one screw hole is provided in each of the attachment plates so that a screw can be screwed through the attachment plate and into a corresponding screw hole in the attachment location of the respective door.

The attachment plates are oriented so that planes through each attachment plate intersect each other at an included angle of at least about 15 degrees and up to 180 degrees. The two doors are supported upright from the floor, and the device of the present invention orients the doors so that the doors, when connected by the device, are completely stable and will not fall over. All surfaces of the two doors are accessible so that they can be readily painted. The only area on the doors which cannot be painted are the hinge attachment locations to which the attachment plates are connected. However, these areas are not to be painted anyway, inasmuch as the hinges on the doors will cover these areas when the doors are installed for their intended use.

In a preferred embodiment of the device of the present invention, means are further provided for adjusting the relative vertical heights of the attachment plates so that two doors of different heights can be accommodated. Advantageously, the elongate connecting member can be made of a resilient material that can be bent but will remain sufficiently rigid after being bent to hold two doors in a stable upright position. Alternatively, the elongate connecting member can be completely rigid, with the attachment plates being attached to the opposite ends of the elongate connecting member by a pivotal attachment means that allows the attachment plates to pivot about their respective ends of the elongate connecting member. The attachment plates are then able to be attached to doors of different heights, with the elongate connecting member slanting downwardly from the attachment plate attached to the taller door to the attachment plate attached to the shorter door.

Additional objects and features of the invention will become apparent from the following detailed description, taken together with the accompanying drawings.

THE DRAWINGS

Preferred embodiments of the present invention representing the best mode presently contemplated of carrying out the invention are illustrated in the accompanying drawings in which.

Figure 5:
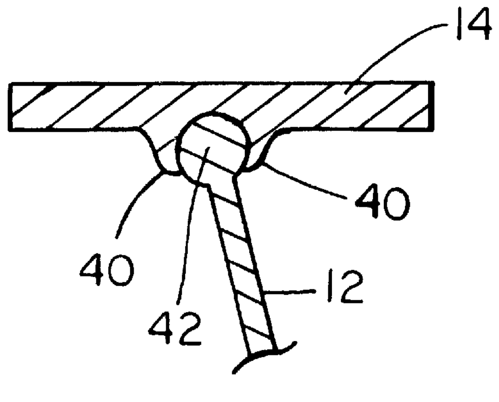
Figure 4:
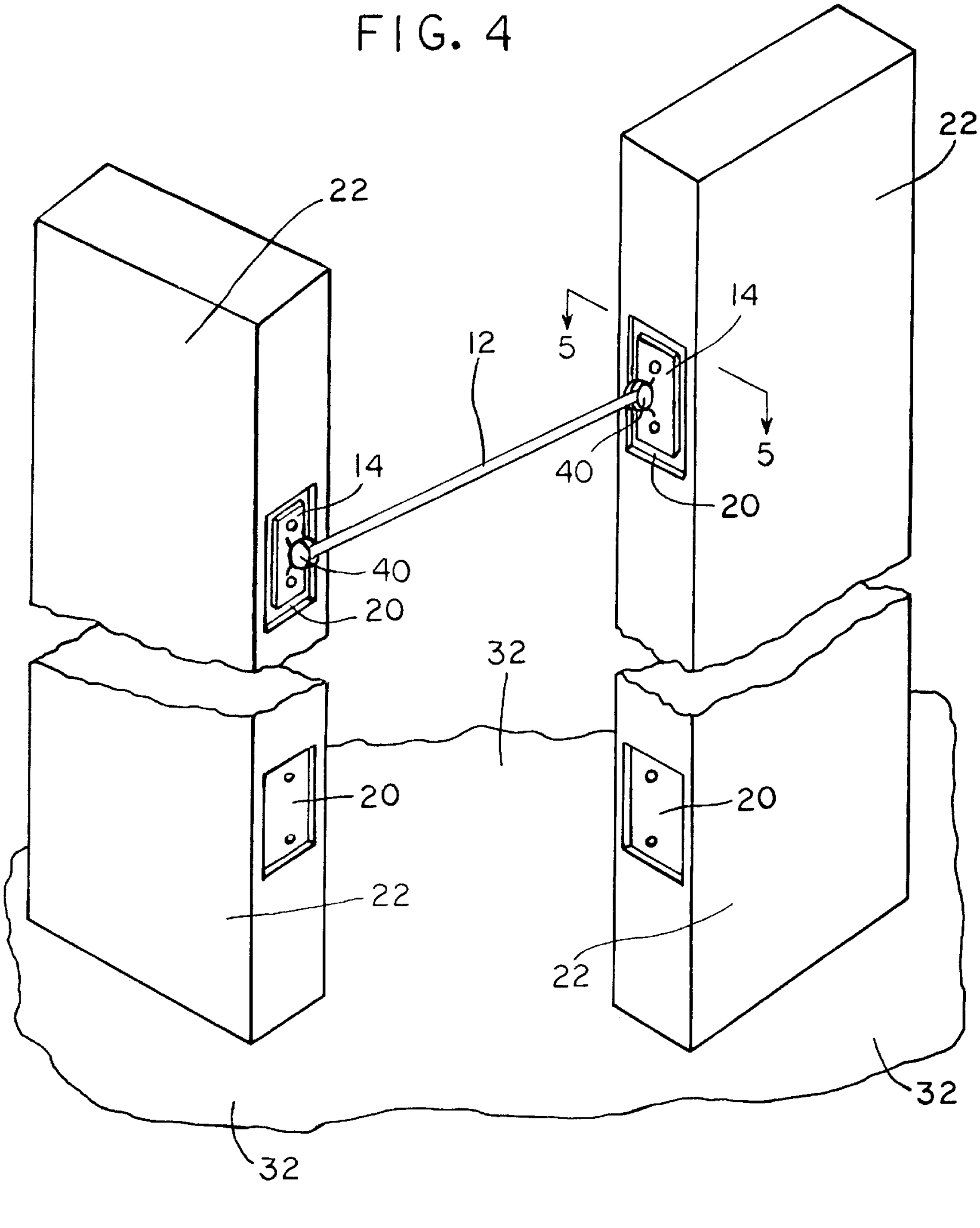

FIG. 4 is a pictorial representation of a second modified embodiment of a device of the present invention, with the second modified embodiment being used to interconnect two doors of different heights; and FIG. 5 is a horizontal cross section through one of the attachment plates of the second modified device of FIG. 4 as taken along line 5—5 of FIG. 4, wherein FIG. 5 illustrates a preferred embodiment of means for pivotally connecting the attachment plates to the opposite ends of the elongate member so that the attachment plates can pivot about the opposite ends of the elongate member.

DETAILED DESCRIPTION OF THE ILLUSTRATED EMBODIMENTS

Figure 1:
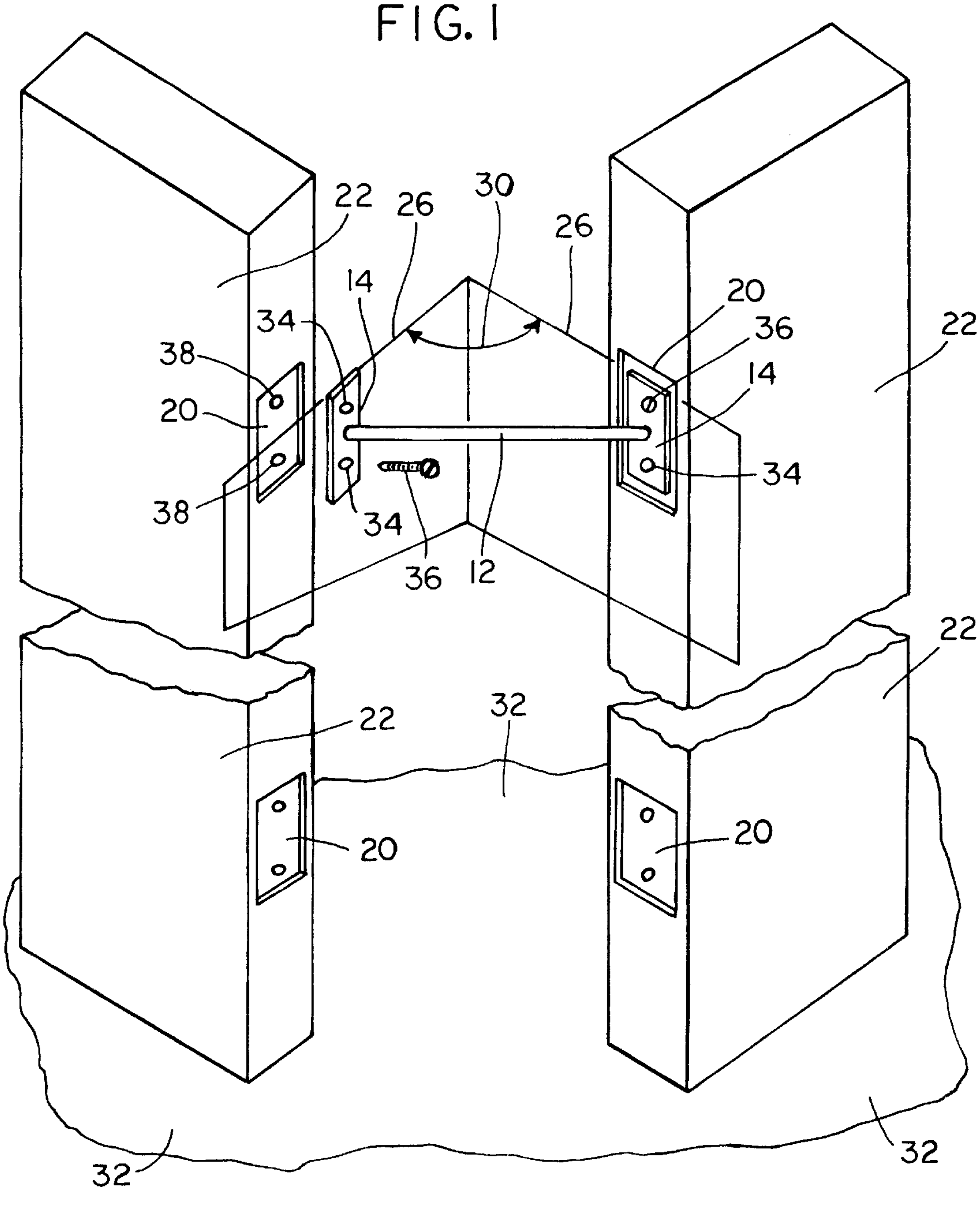
FIG. 1 is a pictorial representation of a device in accordance with the present invention, with the device being shown as used to interconnect two doors so that the doors stand upright from the floor and support each other, with the aid of the device of the present invention, in their upstanding position.
Figure 2:
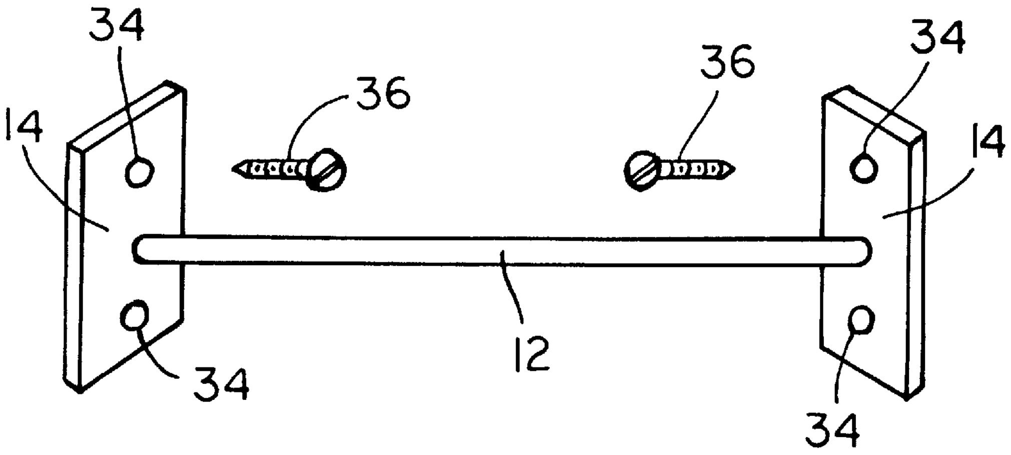
FIG. 2 is a pictorial representation of the device of FIG. 1 shown isolated from the doors.

Referring now to the drawings, several preferred embodiments are shown of a device for interconnecting two doors to hold the doors spaced apart in a standing, upright position so that the doors will stand in a stable condition with all sides of the doors being accessible for painting. In its most elemental form, as illustrated in FIGS. 1 and 2, the device comprises an elongate connecting member 12. The elongate connecting member is generally a stiff rod, bar or spar made of wood, metal or polymeric material.

Attachment members, illustrated as relatively small, planar or flat plates 14, are connected to the opposite ends of the elongate connecting member 12. The attachment members, i.e., flat plates 14, have outwardly facing planar faces, and the outwardly facing faces have a size such that the outwardly facing faces can be received flatwise within hinge attachment locations 20 on the side edges of two respective doors 22. The flat plates 14 can be made of wood, metal or polymeric material. Advantageously the plates 14 are made of either metal or polymeric material. When the plates 14 are made of metal, it is advantageous to make the elongate members of metal also, with the ends of the elongate members 12 being welded or brazed to the flat plates 14 on one of the flat sides of the plates 14. When the plates 14 are made of polymeric material, it is advantageous to mold the plates 14 and the elongate member 12 as an integral unit.

Means are provided for attaching the attachment members, i.e., flat plates 14, to the hinge attachment locations 20 on the side edges of the respective doors 22. Advantageously, the means for attaching the attachment members, i.e., flat plates 14, to the hinge attachment locations 20 on the side edges of the respective doors 22 comprises at least one screw opening 34 in each of the attachment members, and at least one screw 36 that is screwed through at least one of the screw openings 34 in each of the attachment members and into a corresponding screw hole 38 in the attachment location 20 of a respective door 22.

The outwardly facing planar faces of the attachment members, i.e., flat plates 14, are oriented so that vertically oriented planes 26 pass through the outwardly facing planar faces to intersect each other in a vertical line and form an included angle of at least about 15 degrees and up to 180 degrees with each other. When the two doors are interconnected by the device of the present invention, the doors 22 will stand upright from the floor. The doors 22 are spaced apart and do not face each other. All surfaces of the doors 22 are readily accessible for painting. Because the doors 22 do not lie in a common plane, they cannot tip over and thus stand upright in a very stable condition.

Figure 3:
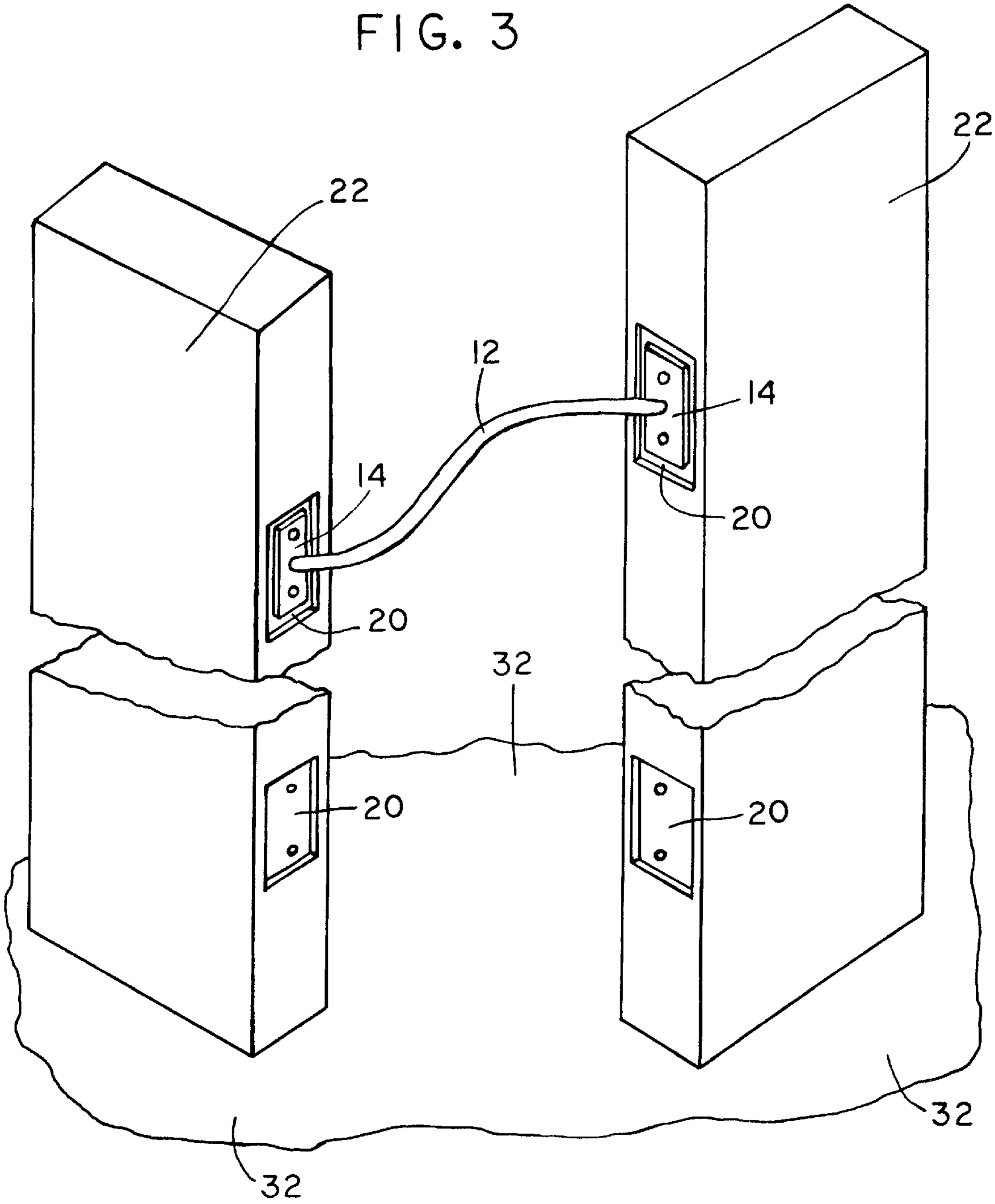
FIG. 3 is a pictorial representation of a first modified embodiment of a device of the present invention, with the first modified embodiment being used to interconnect two doors of different heights.

Two modified embodiments of the device of the present invention are illustrated in FIGS. 3–5. The modified devices allow for adjusting the relative vertical heights of the attachment members, i.e., flat plates 14, so that one of the attachment members can be attached to a hinge location 20 on one of the doors 22 that is taller than the other door 22. A second of the attachment members, i.e., flat plates 14, can be attached to a hinge location 20 on the second door 2, and the connecting member 12 slants downwardly from the first attachment member to the second attachment member.

As illustrated in FIG. 3, the elongate connecting member 12 can be made of a resilient material that can be bent to allow the elongate connecting member 12 to slant downwardly from the one of the attachment members, i.e., flat plates 14, to the second of the attachment members. The elongate connecting member must retain sufficiently rigidity after being bent so as to hold the two doors 22 apart in a stable upright position.

In the embodiment of the device of the present invention as illustrated in FIGS. 4 and 5, the means for adjusting the relative vertical heights of the attachment members comprises pivotal connectors for connecting the attachment members, i.e., flat plates 14, to the opposite ends of the elongate connecting member 12. The pivotal connectors allows the attachment members, i.e., flat plates 14, to pivot about respective ends of the elongate connecting member 12 so that the elongate connecting member can slant downwardly from the one of the attachment members to the second of the attachment members. As illustrated, the pivotal connectors comprise a socket 40 formed on the inner face of the attachment member, i.e., flat plates 14. A ball 42 is formed on each of the ends of the connecting member 12, and each ball 42 is received snugly within a respective socket 40 so that the ball 42 is retained in the socket 40 while being free to pivot or rotated within the socket 40.

Although preferred embodiments of the device of the present invention have been illustrated and described, it is to be understood that the present disclosure is made by way of example and that various other embodiments are possible without departing from the subject matter coming within the scope of the following claims, which subject matter is regarded as the invention.

We claim:

1. A system for interconnecting two doors to hold the doors spaced apart in a standing, upright position so that the doors will stand in a stable condition with all sides of the doors being accessible for painting, said system comprising two doors, each door having hinge attachment locations on the side edge of the door;

an elongate connecting member;

attachment members connected to the opposite ends of said elongate connecting member, said attachment members having outwardly facing planar faces, with said outwardly facing faces received flatwise within hinge attachment locations on the side edges of the respective doors;

means for attaching said attachment members to said hinge attachment locations on the side edges of respective doors; and said outwardly facing planar faces of said attachment members being oriented so that planes through said outwardly facing planar faces intersect each other at an included angle of at least about 15 degrees and up to 180 degrees.

2. A system in accordance with claim 1 wherein means are further provided for adjusting the attachment members so that one of the attachment members can be attached to a hinge location on a first door that is taller than a second door, and a second of the attachment members can be attached to a hinge location on the second door.

3. A system in accordance with claim 2 wherein said means for adjusting the attachment members comprises making said elongate connecting member of a resilient material that can be bent to allow the elongate connecting member to slant downwardly from said one of the attachment members to said second of the attachment members, but with said elongate connecting member remaining sufficiently rigid after being bent so as to hold said two doors apart in a stable upright position.

4. A system in accordance with claim 2 wherein said means for adjusting the attachment members comprises pivotal connectors for connecting said attachment members to the opposite ends of said elongate connecting member which allows the attachment members to pivot about respective ends of said elongate connecting member so that said elongate connecting member can slant downwardly from said one of the attachment members to said second of the attachment members.

5. A system in accordance with claim 1 wherein said means for attaching said attachment members to said hinge attachment locations on the side edges of the respective doors comprises at least one screw opening in each of the attachment members; and at least one screw that is screwed through said at least one screw opening in each of said attachment members and into a corresponding screw hole in the attachment location of a respective door.

* * * * *